(12) United States Patent
Acosta-Cazaubon et al.

(10) Patent No.: US 8,726,059 B2
(45) Date of Patent: May 13, 2014

(54) SYSTEMS AND METHODS FOR USE IN CONTROLLING ENERGY CONSUMPTION WITHIN A BUILDING

(75) Inventors: Jesus Acosta-Cazaubon, Atlanta, GA (US); Paul Michael Kienitz, Kennesaw, GA (US)

(73) Assignee: General Electric Company, Schenectady, NY (US)

( * ) Notice: Subject to any disclaimer, the term of this patent is extended or adjusted under 35 U.S.C. 154(b) by 377 days.

(21) Appl. No.: 13/171,079

(22) Filed: Jun. 28, 2011

(65) Prior Publication Data

US 2013/0007498 A1 Jan. 3, 2013

(51) Int. Cl.
*G06F 1/00* (2006.01)
*G06F 1/26* (2006.01)

(52) U.S. Cl.
USPC ............................ 713/340; 713/320; 713/323

(58) Field of Classification Search
USPC .......................................................... 713/340
See application file for complete search history.

(56) References Cited

U.S. PATENT DOCUMENTS

| | | | |
|---|---|---|---|
| 6,400,103 B1 * | 6/2002 | Adamson | 315/292 |
| 7,043,380 B2 | 5/2006 | Rodenberg, III et al. | |
| 8,082,459 B2 * | 12/2011 | Araujo, Jr. | 713/323 |
| 8,130,698 B2 * | 3/2012 | Cheol | 370/328 |
| 8,476,787 B2 * | 7/2013 | Spitaels et al. | 307/64 |
| 2008/0272934 A1 | 11/2008 | Wang et al. | |
| 2010/0063641 A1 * | 3/2010 | Scholten | 700/287 |
| 2010/0076615 A1 | 3/2010 | Daniel et al. | |
| 2011/0015797 A1 * | 1/2011 | Gilstrap | 700/291 |
| 2011/0022242 A1 * | 1/2011 | Bukhin et al. | 700/291 |
| 2011/0035073 A1 | 2/2011 | Ozog | |
| 2012/0323754 A1 * | 12/2012 | Acosta-Cazaubon et al. | 705/37 |

* cited by examiner

*Primary Examiner* — Suresh Suryawanshi
(74) *Attorney, Agent, or Firm* — Armstrong Teasdale LLP

(57) ABSTRACT

A computing device is provided. The computing device includes a communication interface that is configured to receive at least one signal from a utility, wherein the signal is representative of a request for a reduction of energy consumption within a building. Moreover, the computing device includes a processor that is coupled to the communication interface and is programmed to identify at least one machine within the building that is subject to the request. The processor is further programmed to generate at least one proposed control parameter for the machine based on the request. A user interface is coupled to processor and configured to enable a user of the machine to provide a response to the control parameter.

20 Claims, 2 Drawing Sheets

SYSTEMS AND METHODS FOR USE IN CONTROLLING ENERGY CONSUMPTION WITHIN A BUILDING

BACKGROUND OF THE INVENTION

The field of the invention relates generally to energy control systems and, more particularly, to a computing device that may be used to control energy consumption.

The combination of the increasing world population and the increased use of electric vehicles has created an increased electricity energy demand. Energy demand has also increased for use to power buildings, homes, and/or to charge batteries or other energy sources used in electric vehicles. The demand on the power grid has increased as the cost of fuel has increased. Such demands will likely cause an increase in the price of energy from the power grid. In particular, initially at least, the price of energy is likely to increase during peak times of high demand.

Currently, at least some known utility companies use demand response to manage and/or reduce the consumption of energy by their customers in response to supply conditions. For example, at least some known utility companies may have customers reduce their consumption at critical times and/or in response to market prices. To better manage their customers, at least some known utility companies may use smart grid applications that provide time-based pricing that enables customers to selectively adjust their usage to take advantage of fluctuating prices. Moreover, some known utility companies may provide information, regarding their fluctuating prices for example, to customers using various notification methods, such as e-mails and/or text messages.

Moreover, at least some known utility companies may monitor the use of household energy consumption. Utility companies may provide their customers with a computing device, such as a smart meter, that can monitor household energy consumption. Such a computing device may, for example, provide a signal for a change in a variable utility rate and enable a user to adjust his or her operation of household appliances based on the rate. Such computing devices may also facilitate an automatic power shutdown and/or adjustment of a household appliance during peak energy demand times and/or pursuant to a request from the utility. For example, during peak demand times, the utility may transmit a signal to computing device requesting a power shut down and/or adjustment of a household or building. However, such computing devices respond to the request by shutting down and/or making adjustments without considering various parameters, such as a current state and/or operational state of a machine, resulting in potentially harmful operating effects. For example, such computing devices are unable to identify which household machine(s) should not be subject to the request and which machine(s) should be shut down and/or adjusted during peak times. Such computing devices also are unable to provide any alternative options to meet the request and/or negotiate parameters surrounding the request. Such computing devices also do not enable the user to provide a response to the utility's request for the power shutdown and/or adjustment. For example, the user is unable to either accept or deny the request from the utility. The user is also unable to provide any alternative options to meet the request and/or negotiate parameters surrounding the request. The user is also unable to systemically commit to an alternative energy consumption level.

BRIEF DESCRIPTION OF THE INVENTION

In one embodiment, a computing device is provided. The computing device includes a communication interface that is configured to receive at least one signal from a utility, wherein the signal is representative of a request for a reduction of energy consumption within a building. Moreover, the computing device includes a processor that is coupled to the communication interface and is programmed to identify at least one machine within the building that is subject to the request. The processor is further programmed to generate at least one proposed control parameter for the machine based on the request. A user interface is coupled to processor and configured to enable a user of the machine to provide a response to the control parameter.

In another embodiment, an energy control system is provided. The control system includes a computing device and controller that is coupled to the computing device. The computing device includes a communication interface that is configured to receive at least one signal from a utility, wherein the signal is representative of a request for a reduction of energy consumption within a building. Moreover, the computing device includes a processor that is coupled to the communication interface and is programmed to identify at least one machine within the building that is subject to the request. The processor is further programmed to generate at least one proposed control parameter for the machine based on the request. A user interface is coupled to processor and configured to enable a user of the machine to provide a response to the control parameter. Moreover, the controller is configured to receive at least one signal representative of the proposed control parameter and to execute and/or transmit the proposed control parameter.

In yet another embodiment, a method for use in controlling energy consumption is provided. At least one signal from a utility is received, via a communication interface, wherein the signal is representative of a request for a reduction of energy consumption within a building. At least one machine within the building that is subject to the request is identified, via a processor. At least one proposed control parameter for the machine is generated based on the request, via the processor. A user of the machine is enabled, via a user interface, to provide a response to the control parameter.

DETAILED DESCRIPTION OF THE INVENTION

The exemplary systems and methods described herein overcome at least some known disadvantages of known energy control systems to reduce energy consumption, by providing a system that enables the identification of household machines that are subject to a request for a reduction of energy consumption by a utility and the system enables a user of the machines to provide a response to the utility's request. More specifically, the embodiments described herein provide a computing device for use with an energy control system. The computing device includes a communication interface that is configured to receive at least one signal from a utility, wherein the signal is typically representative of a request for a reduction or allocation of energy consumption within a building. Moreover, the computing device includes a processor that is coupled to the communication interface and is programmed to identify at least one machine within the building that is subject to the request. The processor is further programmed to generate at least one proposed control parameter for the machine based on the request. A user interface is coupled to processor and configured to enable a user of the machine to provide a response to the control parameter. For example, the user may provide any alternative options to meet the request and/or negotiate parameters surrounding the request. The user is also able to systemically commit to an alternative energy consumption level.

Figure 1:
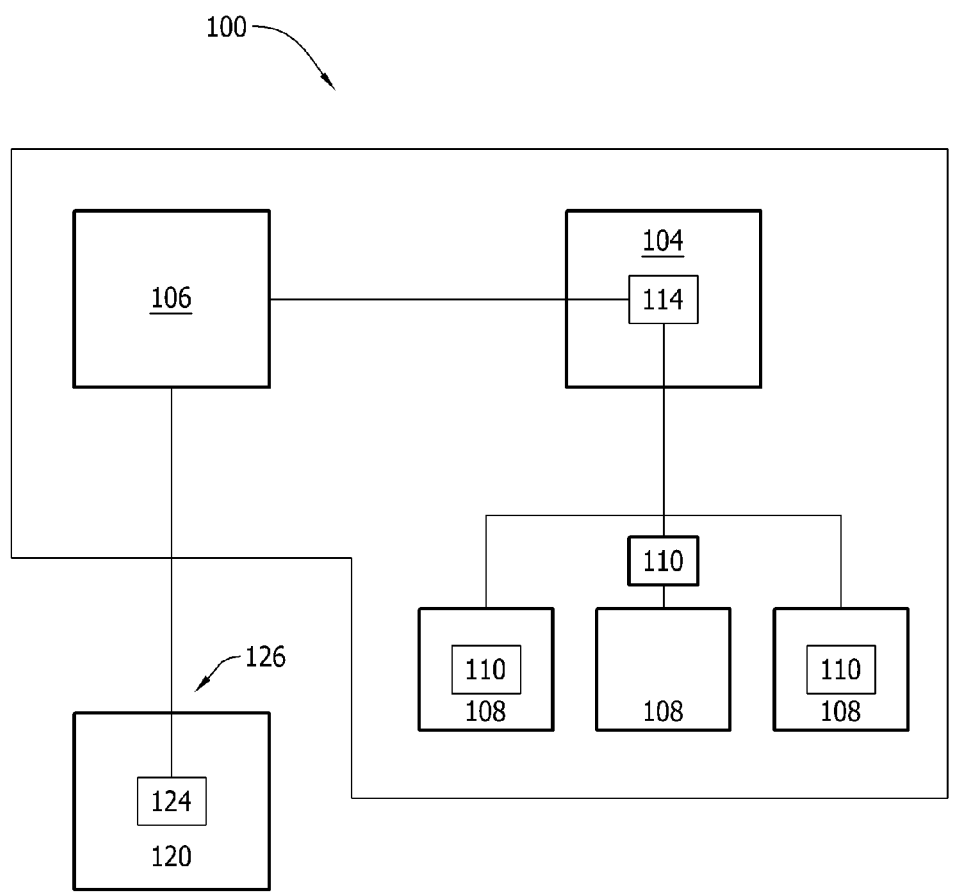
FIG. 1 is a block diagram of an exemplary energy control system.

FIG. 1 illustrates an exemplary energy control system 100 that includes a controller 104 and a computing device 106 that is coupled to controller 104. It should be noted that, as used herein, the term "couple" is not limited to a direct mechanical, electrical, and/or communicative connection between components, but may also include an indirect mechanical, electrical, and/or communication connection between multiple components. In the exemplary embodiment, control system 100 is located within a building (not shown), such as a dwelling. Alternatively, control system 100 may be located within any other structure or location that enables control system 100 to function as described herein.

In the exemplary embodiment, controller 104 is coupled to at least one machine 108, such as an appliance and/or a computer, that is located within the building. In the exemplary embodiment, three machines 108 are illustrated. However, it should be noted, that controller 104 may be coupled to any number of machines 108. In the exemplary embodiment, controller 104 is a separate component that is coupled to a control valve 110, such as a smart outlet. Alternatively, controller 104 and control valve 110 may be a single component. In the exemplary embodiment, valve 110 may be coupled within machine 108 such that valve 110 is part of machine 108 or coupled to machine 108 as a separate component. In the exemplary embodiment, each control valve 110 is a control switch that is used to energize and/or de-energize the operation of machine 108. Alternatively, each control valve 110 may also be used to selectively adjust the power within machine 108 to a reduced and/or increased operation state.

In the exemplary embodiment, controller 104 is a real-time controller that includes any suitable processor-based or microprocessor-based system, such as a computer system, that includes microcontrollers, reduced instruction set circuits (RISC), application-specific integrated circuits (ASICs), logic circuits, and/or any other circuit or processor that is capable of executing the functions described herein. In one embodiment, controller 104 may be a microprocessor that includes read-only memory (ROM) and/or random access memory (RAM), such as, for example, a 32 bit microcomputer with 2 Mbit ROM and 64 Kbit RAM. As used herein, the term "real-time" refers to outcomes occurring in a substantially short period of time after a change in the inputs affect the outcome, with the time period being a design parameter that may be selected based on the importance of the outcome and/or the capability of the system processing the inputs to generate the outcome.

Controller 104, in the exemplary embodiment, includes a communication interface 114 that is communicatively coupled to computing device 106 and to control valve 110. In the exemplary embodiment, controller 104 may communicate with computing device 106 and/or control valve 110 using a wired network connection (e.g., Ethernet or an optical fiber), a wireless communication means, such as radio frequency (RF), e.g., FM radio and/or digital audio broadcasting, a power line carrier communication, an Institute of Electrical and Electronics Engineers (IEEE®) 802.11 standard (e.g., 802.11(g) or 802.11(n)), the Worldwide Interoperability for Microwave Access (WIMAX®) standard, a cellular phone technology (e.g., the Global Standard for Mobile communication (GSM)), a satellite communication link, and/or any other suitable communication means. WIMAX is a registered trademark of WiMax Forum, of Beaverton, Oreg. IEEE is a registered trademark of the Institute of Electrical and Electronics Engineers, Inc., of New York, N.Y. More specifically, in the exemplary embodiment, controller 104 is configured to receive at least one signal from computing device 106 that is representative of at least one proposed control parameter. Moreover, in the exemplary embodiment, controller 104 is configured to execute the proposed control parameter.

In the exemplary embodiment, control system 100 is communicatively coupled to a utility 120. More specifically, computing device 106 is communicatively coupled to utility 120. Utility 120, in the exemplary embodiment, includes a network interface 124 that is coupled to a network 126 that enables utility 120 to communicate with computing device 106. In the exemplary embodiment, utility 120 may communicate with computing device 106 using a wired network connection (e.g., Ethernet or an optical fiber), a wireless communication means, such as radio frequency (RF), e.g., FM radio and/or digital audio broadcasting, a power line carrier communication, an Institute of Electrical and Electronics Engineers (IEEE®) 802.11 standard (e.g., 802.11(g) or 802.11(n)), the Worldwide Interoperability for Microwave Access (WIMAX®) standard, a cellular phone technology (e.g., the Global Standard for Mobile communication (GSM)), a satellite communication link, and/or any other suitable communication means. More specifically, in the exemplary embodiment, computing device 106 receives at least one signal from utility 120 that is representative of a request for a power reduction within a building.

During operation, utility 120 identifies when a peak demand time for energy usage is or is predicted to be occurring. Such operating times, also known as peak power hours, for example, include times when energy consumption is relatively high and energy availability within a power grid (not shown) is lower than the demand. Utility 120 transmits a signal to control system 100 that is representative of a request for a reduction in energy consumption at a specific location and/or within a building. More specifically, utility 120 transmits a signal to computing device 106. As explained in more detail below, when computing device 106 receives such a signal, computing device 106 identifies at least one machine 108 that is subject to the request for a power reduction. In the exemplary embodiment, computing device 106 identifies each machine 108 as being subject to the request for a reduction in energy consumption. Alternatively, computing device 106 may identify that only a subset of the machines 108 within the building are subject to the request.

As explained in more detail below, in the exemplary embodiment, computing device 106 generates at least one proposed control parameter for each machine 108 based on the request. In the exemplary embodiment, the proposed control parameter is a power shutdown for each machine 108. Alternatively, the proposed control parameter may be a reduced operating power state for each machine 108. Computing device 106 presents the proposed control parameter for each machine 108 to the user of each machine 108 such that the user may provide a response to the proposed control parameter. For example, as explained in more detail below, the user may deny or accept the proposed control parameter. The user may also provide an alternative control parameter and/or negotiate the control parameter to meet the request made by utility 120.

In the exemplary embodiment, the user accepts the proposed parameter and a signal representative of the proposed control parameter is transmitted from computing device 106 to controller 104. In the exemplary embodiment, the signal is representative of a power shutdown of each machine 108. Controller 104 receives the signal via communication interface 114, and in response, executes the proposed control parameter. More specifically, controller 104 transmits a signal representative of a control function, such as an "on" and/or "off" function, to each control valve 110. Controller 104 may also transmit a signal representative of a "pause", a "stand by", and/or a "lock-out" mode to each control valve 110.

In the exemplary embodiment, controller 104 transmits a signal representative of an "off" function, and in response, each control valve 110, after receiving the signal, stops operation of each respective machine 108 off for a period of time. A signal from computing device 106 is transmitted to controller 104 when the period of time for the power shut down is complete. Controller 104 then transmits a signal representative of an "on" function to each control valve 110 and when each control valve 110 receives the signal, each control valve 110 initiates operation of respective machine 108.

Moreover, if peak power demands for energy no longer exist while each machine 108 is shut down pursuant to the implemented control parameter, utility 120 may transmit a signal to control system 100 that is representative of resuming power and/or energy consumption within the building. More specifically, utility 120 may transmit a signal to computing device 106 that causes computing device 106 to generate at least one proposed control parameter for each machine 108. In the exemplary embodiment, the user accepts the proposed control parameter and a signal representative of the proposed control parameter may be transmitted from computing device 106 to controller 104. In the exemplary embodiment, the signal is representative of a "power on" for each machine 108. Controller 104 receives the signal via communication interface 114. Controller 104 then executes the proposed control parameter. More specifically, controller 104 transmits a signal representative of an "on" function and when each control valve 110 receives the signal, each control valve 110 initiates operation of respective machine 108.

Figure 2:
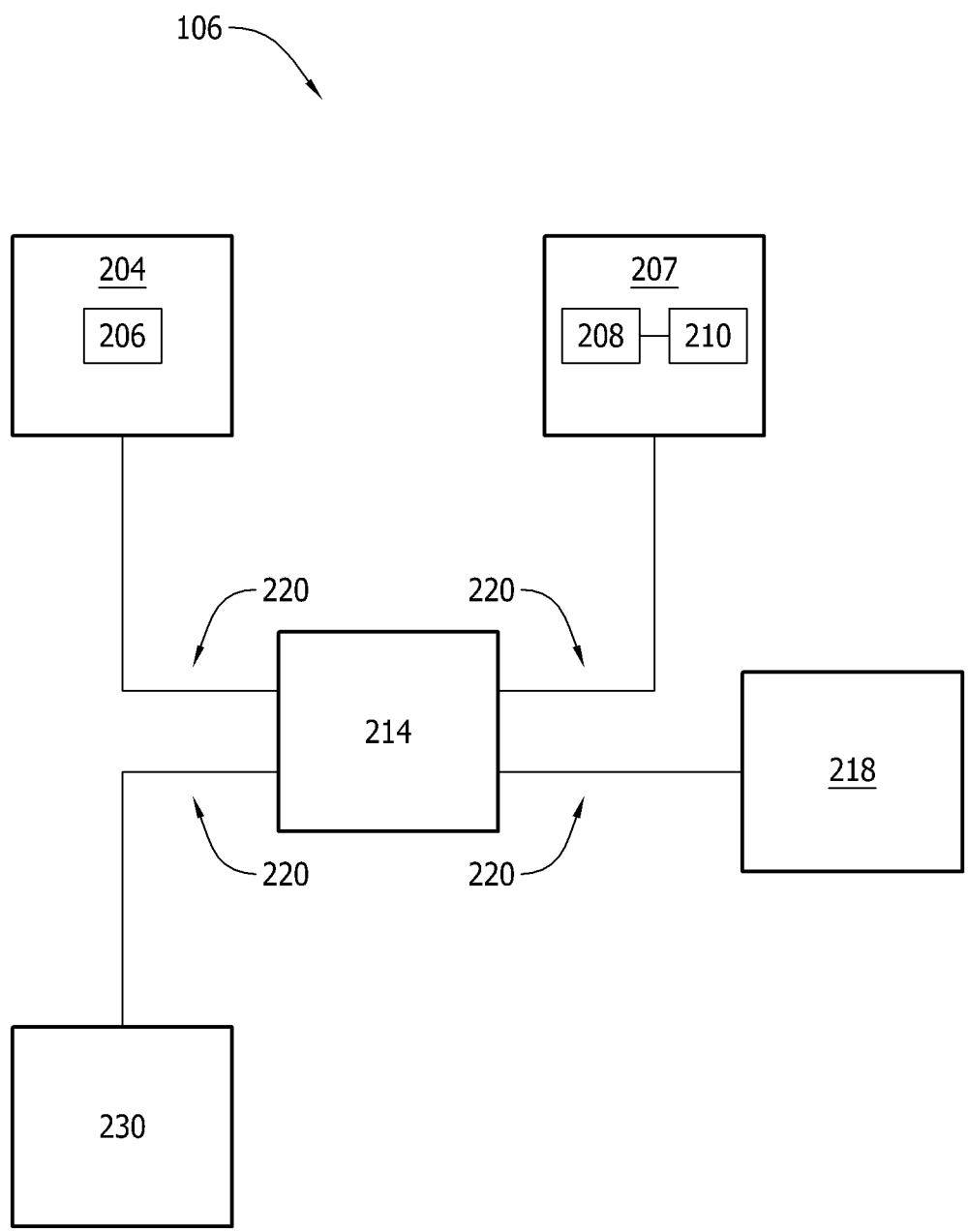
FIG. 2 is a block diagram of an exemplary computing device that may be used with the energy control system shown in FIG. 1.

FIG. 2 is an exemplary block diagram of computing device 106. In the exemplary embodiment, computing device 106 includes a user interface 204 that receives at least one input from a user. In the exemplary embodiment, user interface 204 includes a keyboard 206 that enables the user to input pertinent information. Alternatively, user interface 204 may include, for example, a pointing device, a mouse, a stylus, a touch sensitive panel (e.g., a touch pad or a touch screen), a gyroscope, an accelerometer, a position detector, and/or an audio input interface (e.g., including a microphone).

Moreover, in the exemplary embodiment, computing device 106 includes a presentation interface 207 that presents information, such as input events and/or validation results, to the user. In the exemplary embodiment, presentation interface 207 includes a display adapter 208 that is coupled to at least one display device 210. More specifically, in the exemplary embodiment, display device 210 is a visual display device, such as a cathode ray tube (CRT), a liquid crystal display (LCD), an organic LED (OLED) display, and/or an "electronic ink" display. Alternatively, presentation interface 207 may include an audio output device (e.g., an audio adapter and/or a speaker) and/or a printer.

Computing device 106 also includes a processor 214 and a memory device 218. In the exemplary embodiment, processor 214 is coupled to user interface 204, to presentation interface 207, and to memory device 218 via a system bus 220. In the exemplary embodiment, processor 214 communicates with the user, such as by prompting the user via presentation interface 207 and/or by receiving user inputs via user interface 204. Moreover, in the exemplary embodiment, processor 214 is programmed by encoding an operation using one or more executable instructions and providing the executable instructions in memory device 218. For example, in the exemplary embodiment, processor 214 is programmed to identify at least one machine, such as each machine 108 that is subject to a request for a reduction in energy consumption that is received from utility 120 (shown in FIG. 1). In the exemplary embodiment, processor 214 is programmed to identify at least one machine 108 by considering various criteria and/or parameters. For example, processor 214 may consider at least one operational parameter of each machine 108, such as a power level required for the operation of each machine 108. Such criteria and parameters may be established and programmed by a user of machine 108. Moreover, processor 214 is programmed to identify at least one machine 108 by considering each machine 108 within the building. For example, processor 214 is programmed to generate a hierarchy for machines 108 based on various parameters. Such parameters may also be established and programmed by the user of machine 108. For example, processor 214 may generate a hierarchy of machines 108, wherein machine 108 requiring the highest amount of power for its operation is organized or rank-ordered as a first tier within the hierarchy and machine 108 requiring the least amount of power for its operation is organized or rank-ordered as a last tier within the hierarchy. By considering each machine 108, processor 214 is able to identify which machine 108 should be subject to the request for a reduction in energy consumption.

Processor 214, in the exemplary embodiment, is also programmed to generate at least one proposed control parameter for at least one machine 108. In the exemplary embodiment, the proposed control parameter may include various operational parameters for each machine 108, such as a power reduction for a period of time, a complete power shut down for a period of time, and/or any other operational parameter that enables control system 100 (shown in FIG. 1) and/or computing device 106 to function as described herein. Processor 214 may generate at least one proposed control parameter based at least in part, for example, by at least one operational state or operating parameters of machine 108 that may be communicated to processor 214. As explained in more detail below, processor 214 may also regenerate the hierarchy and/or the control parameters based on information received from the user and/or machine 108.

The term "processor" refers generally to any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term "processor."

In the exemplary embodiment, memory device 218 includes one or more devices that enable information, such as executable instructions and/or other data, to be stored and retrieved. Moreover, in the exemplary embodiment, memory device 218 includes one or more computer readable media, such as, without limitation, dynamic random access memory (DRAM), static random access memory (SRAM), a solid state disk, and/or a hard disk. In the exemplary embodiment, memory device 218 stores, without limitation, application source code, application object code, configuration data, additional input events, application states, assertion statements, validation results, and/or any other type of data. More specifically, in the exemplary embodiment, memory device 218 stores input data received by a user via user interface 204, and/or information received from other components of control system 100 and/or the building.

Computing device 106, in the exemplary embodiment, also includes a communication interface 230 that is coupled to processor 214 via system bus 220. Moreover, in the exemplary embodiment, communication interface 230 is communicatively coupled to utility 120 via network 126 (shown in FIG. 1) and communicatively coupled to controller 104 (shown in FIG. 1). In the exemplary embodiment, communication interface 230 communicates with utility 120, controller 104, other components within control system 100, and/or other components within the building.

During operation, a user, such as an owner of a building, inputs information regarding machines 108 via user interface 204. For example, the user may input the type of machine 108 and/or at least one operational parameter for each machine 108, such as a power level required for the operation of each machine 108. The user may input such information to program criteria and parameters that computing device 106 may use. Alternatively, computing device 106 may automatically retrieve the information from a database (not shown) and/or a sensor (not shown) coupled to each machine 108 via communication interface 230. Information about each machine 108 is transmitted to processor 214 and to memory device 218 for storage.

In the exemplary embodiment, utility 120 identifies when a peak demand time for energy usage is occurring and/or is predicted to occur. In the exemplary embodiment, utility 120 transmits a signal to computing device 106 representative of a request for a reduction in energy consumption. Alternatively, utility 120 may also transmit a proposed control parameter. When communication interface 230 receives the signal, communication interface 230 transmits the signal to processor 214. Processor 214 identifies at least one machine 108 that is subject to the request. More specifically, in the exemplary embodiment, processor 214 identifies each machine 108 by considering the criteria and parameters provided by the user. For example, processor 214 may consider at least one operational parameter of each machine 108, such as a power level required for the operation of each machine 108. Moreover, in the exemplary embodiment, each machine 108 may be identified by considering the plurality of machines 108 within a specific operating location, such as a specific building (not shown). For example, processor 214 may generate a rank-order hierarchy for machines 108 based on criteria, operating status, and/or operational parameters provided to and/or accepted by the user. For example, machine 108 requiring the highest amount of power for its operation may be rank-ordered or organized as a first tier within the hierarchy by processor 214 and machine 108 requiring the least amount of power for its operation may be rank-ordered or organized as a last tier within the hierarchy. Alternatively, processor 214 may rank-order or organize machines 108 using other criteria or parameters. For example, processor 214 may rank-order or organize machine 108 based on time constraints, operating state, or operational status for power shut down of each machine 108 that is provided by the user and/or by the sensors on machines (108). The hierarchy may be presented to the user via presentation interface 207. The user may accept or deny the hierarchy presented via user interface 204. The user may also propose an alternate hierarchy via user interface 204. If the user denies the hierarchy or proposes an alternative hierarchy, then processor 214 will generate a new hierarchy. Moreover, if the operating status and/or operational parameters change for machines(s) 108, processor 214 may generate a new hierarchy.

By considering at least one machine 108, processor 214 is able to identify which machine 108 is subject to the request for a reduction in energy consumption. In the exemplary embodiment, processor 214 identifies at least one machine 108 as being subject to the request for a reduction in energy consumption. Alternatively, processor 214 may only identify that a subset of the three machines are subject to the request.

Moreover, in the exemplary embodiment, processor 214 generates at least one proposed control parameter for at least one machine 108. More specifically, in the exemplary embodiment, processor 214 generates a proposed control parameter for a power shut down of each machine 108 for a period of time. Alternatively, processor 214 may generate a proposed control parameter for a reduction of power for each machine 108 for a period of time. Processor 214 may also generate any other proposed control parameter for machine 108 that enables energy control system 100 to function as described herein. For example, processor 214 may determine a control parameter by considering an operational state of machine 108 and then determine that various operational states of machines 108 may or may not need to be changed based on the consideration.

In the exemplary embodiment, each machine 108 identified and/or the proposed control parameter for each machine 108 is presented to the user via presentation interface 207. The user is prompted, via presentation interface 207, to provide a response to the proposed control parameter. For example, in the exemplary embodiment, the user, via user interface 204, accepts the proposed control parameter for each machine 108. Alternatively, the user may deny the proposed control parameter for each machine 108 or at least one machine 108. The user may also input, via user interface 204, at least one alternative control parameter for at least one machine 108 and/or negotiate the proposed control parameter. For example, the user may identify that machine 108 has only eight minutes left to complete a cycle, as in the case of a washing machine. When the user sees the control parameter to, for example, shut down in two minutes, the user may input an alternative parameter to, for example, shut down in ten minutes when the cycle is complete. Processor 214 would then generate a new hierarchy based on the alternative parameter provided by the user and/or generate a new control parameter based on the input provided by the user. The user may have also previously input control parameters that are pre-programmed in processor 214 that may be implemented. Alternatively, computing device 106 may generate at least one alternative control parameter for at least one machine 108 and/or negotiate the proposed control parameter. For example, processor 214 may generate a control parameter to shut down machine 108 in two minutes. However, the sensors on machine 108 may identify that machine 108 has only eight minutes left to complete a cycle, as in the case of a washing machine. The sensor may transmit such information to computing device 106. Processor 214 may then generate a new hierarchy and/or generate a new control parameter from having machine 108 shut down in, for example, ten minutes when the cycle is complete.

In the exemplary embodiment, when the user accepts the proposed control parameter, processor 214 generates various time ranges that the proposed control parameter may be implemented. For example, processor 214 generates various start and end times for the proposed control parameters. The time ranges are presented to the user via presentation interface 207. The user can choose one of the time ranges or propose an alternative time range for the implementation of the proposed control parameter. In the exemplary embodiment, the user inputs one of the time ranges provided by computing device 106.

In the exemplary embodiment, a signal representative of the proposed control parameter is transmitted from communication interface 230 to controller 104. In the exemplary embodiment, the signal is representative of a power shutdown of each machine 108. Controller 104 receives the signal via communication interface 114 (shown in FIG. 1). Controller 104 then executes the proposed control parameter. More specifically, controller 104 transmits a signal representative of a control function, such as an "on" and/or "off" function, to each control valve 110 (shown in FIG. 1). In the exemplary embodiment, controller 104 transmits a signal representative of an "off" function and when each control valve 110 receives the signal, each control valve 110 ceases operation of respective machine 108 for a period of time. A signal from processor 214 is transmitted to controller 104 when the period of time for the power shut down is complete. Controller 104 then transmits a signal representative of an "on" function to each control valve 110 and when each control valve 110 receives the signal, each control valve 110 initiates operation of respective machine 108.

Moreover, if a peak demand for energy no longer exists while each machine 108 is shut down pursuant to the implemented control parameter, utility 120 may transmit a signal to control system 100, in real-time or pre-programmed time, that is representative of resuming power fully or allocating a new power consumption level within a building. For example, utility 120 may transmit a signal to computing device 106. Processor 214 generates at least one proposed control parameter for each machine 108. The user is presented, via presentation interface 207, that each machine 108 may resume power and/or the proposed control parameter for each machine 108. Moreover, the user is prompted, via presentation interface 207, to either accept or deny the proposed control parameter for each machine 108. In the exemplary embodiment, the proposed control parameter for each machine 108 is a power "on" or normal operation for each machine 108. Alternatively, the proposed control parameter for each machine 108 may be an increase in power for each machine 108. The user, via user interface 204, accepts the proposed control parameter for each machine 108. Alternatively, the user may deny the proposed control parameter for each machine 108 and/or may input, via user interface 204, at least one alternative control parameter for each machine 108.

In the exemplary embodiment, a signal representative of the proposed control parameter is transmitted from communication interface 230 to controller 104. In the exemplary embodiment, the signal is representative of a power "on" of each machine 108. Controller 104 receives the signal via communication interface 114. Controller 104 then executes the proposed control parameter. More specifically, controller 104 transmits a signal representative of an "on" function and when each control valve 110 receives the signal, each control valve 110 initiates operation of respective machine 108 for a period of time.

As compared to known systems and methods that are used to manage consumption of energy and/or monitor household machines, the exemplary systems and methods described herein provides a system that enables the identification of household machines that are subject to a request for a reduction of energy consumption initiated by a utility and the system enables a user of the machines to provide a response to the utility's request. More specifically, the embodiments described herein provide a computing device for use with an energy control system. The computing device includes a communication interface that is configured to receive at least one signal from a utility, wherein the signal is representative of a request for a reduction of energy consumption within a building. Moreover, the computing device includes a processor that is coupled to the communication interface and is programmed to identify at least one machine within the building that is subject to the request. The processor is further programmed to identify that the request can be met and then to generate at least one proposed control parameter for the machine based on the request. A user interface is coupled to processor and configured to enable a user of the machine to provide a response to the control parameter.

A technical effect of the systems and methods described herein includes at least one of: (a) receiving, via a communication interface, at least one signal from a utility, wherein the at least one signal is representative of a request for a reduction of energy consumption within a building; (b) identifying, via a processor, at least one machine within a building that is subject to a request; (c) generating, via a processor, at least one proposed control parameter for at least one machine based on a request; and (d) enabling, via a user interface, a user of at least one machine to provide a response to at least one control parameter.

Exemplary embodiments of the systems and methods are described above in detail. The systems and methods are not limited to the specific embodiments described herein, but rather, components of the systems and/or steps of the methods may be utilized independently and separately from other components and/or steps described herein. For example, the system may also be used in combination with other apparatus, systems, and methods, and is not limited to practice with only the system as described herein. Rather, the exemplary embodiment can be implemented and utilized in connection with many other applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A computing device comprising:
   a communication interface configured to receive at least one signal from a utility, wherein the at least one signal is representative of a request for reduction of energy consumption within a building;
   a processor coupled to said communication interface and programmed to identify at least one machine within the building that is subject to the request, said processor is further programmed to generate at least one proposed control parameter for the at least one machine based on the request; and
   at least one sensor communicatively coupled to said processor, said at least one sensor is configured to determine a current operating state for the at least one machine, said processor is further programmed to generate at least one alternative control parameter based on the sensed operating state of the at least one machine.

2. A computing device in accordance with claim 1, further comprising:
a user interface coupled to said processor and configured to enable a user of the at least one machine to provide a response to the at least one control parameter and
a presentation interface coupled to said processor and configured to present at least one of the at least one machine identified and the at least one proposed control parameter to the user.

3. A computing device in accordance with claim 2, wherein said user interface is configured to enable the user to accept the at least one proposed control parameter.

4. A computing device in accordance with claim 2, wherein said user interface is configured to enable the user to input at least one alternative control parameter for the at least one machine.

5. A computing device in accordance with claim 2, wherein said user interface is configured to enable the user to negotiate the at least one proposed control parameter for the at least one machine.

6. A computing device in accordance with claim 1, wherein said processor identifies the at least one machine by considering at least one operational parameter of the at least one machine, the at least one operational parameter includes a power level required for the operation of the at least one machine.

7. An energy control system comprising:
a computing device comprising:
a communication interface configured to receive at least one signal from a utility, wherein the at least one signal is representative of a request for a reduction of energy consumption within a building;
a processor coupled to said communication interface and programmed to identify at least one machine within the building that is subject to the request, said processor is further programmed to generate at least one proposed control parameter for the at least one machine based on the request;
at least one sensor communicatively coupled to said processor, said at least one sensor is configured to determine a current operating state for the at least one machine, said processor is further programmed to generate at least one alternative control parameter based on the sensed operating state of the at least one machine; and
a controller coupled to said computing device, said controller configured to receive at least one signal representative of at least one of the at least one proposed control parameter and the at least one alternative control parameter and to execute at least one of the at least one proposed control parameter and the at least one alternative control parameter.

8. An energy control system in accordance with claim 7, wherein said computing device further comprises:
a user interface coupled to said processor and configured to enable a user of the least one machine to provide a response to the at least one control parameter and
a presentation interface coupled to said processor and configured to present at least one of the at least one machine identified and the at least one proposed control parameter to the user.

9. An energy control system in accordance with claim 8, wherein said user interface is configured to enable the user to accept the at least one proposed control parameter for the at least one machine.

10. An energy control system in accordance with claim 8, wherein said user interface is configured to enable the user to input at least one alternative control parameter for the at least one machine.

11. An energy control system in accordance with claim 8, wherein said user interface is configured to enable the user to negotiate the at least one proposed control parameter for the at least one machine.

12. An energy control system in accordance with claim 7, wherein said processor identifies the at least one machine by considering at least one operational parameter of the at least one machine, the at least one operational parameter includes a power level required for the operation of the at least one machine.

13. A method for use in controlling energy consumption, said method comprising:
receiving, via a communication interface, at least one signal from a utility, wherein the at least one signal is representative of a request for a reduction of energy consumption within a building;
identifying, via a processor, at least one machine within the building that is subject to the request;
generating, via the processor, at least one proposed control parameter for the at least one machine based on the request;
determining, via at least one sensor, a current operating state for the at least one machine; and
generating, via the processor, at least one alternative control parameter based on the sensed operating state of the at least one machine.

14. A method in accordance with claim 13, further comprising:
enabling, via a user interface, a user of the at least one machine to provide a response to the at least one control parameter and
presenting, via a presentation interface, at least one of the at least one machine identified and the at least one proposed control parameter to the user.

15. A method in accordance with claim 14, wherein enabling, via a user interface, a user of the least one machine to provide a response to the at least one control parameter further comprises, enabling, via the user interface, the user to accept the at least one proposed control parameter.

16. A method in accordance with claim 14, wherein enabling, via a user interface, a user of the least one machine to provide a response to the at least one control parameter further comprises, enabling, via the user interface, the user to input at least one alternative control parameter for the at least one machine.

17. A method in accordance with claim 14, wherein enabling, via a user interface, a user of the least one machine to provide a response to the at least one control parameter further comprises, enabling, via the user interface, the user to negotiate the at least one control parameter for the at least one machine.

18. A method in accordance with claim 13, wherein identifying, via a processor, at least one machine further comprises identifying, via the processor, the at least one machine by considering a plurality of machines within the building.

19. A computing device in accordance with claim 1, wherein said processor is further programmed to adjust the current operating state of the at least one machine based on one of the at least one proposed control parameter and the at least one alternative control parameter.

20. A computing device in accordance with claim 13, further comprising adjusting the current operating state of the at least one machine based on one of the at least one proposed control parameter and the at least one alternative control parameter.

* * * * *